United States Patent
Satish et al.

(10) Patent No.: US 7,958,102 B1
(45) Date of Patent: Jun. 7, 2011

(54) METHOD AND APPARATUS FOR SEARCHING A STORAGE SYSTEM FOR CONFIDENTIAL DATA

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 452 days.

(21) Appl. No.: 11/729,397

(22) Filed: Mar. 28, 2007

(51) Int. Cl.
*G06F 17/30* (2006.01)

(52) U.S. Cl. ........ 707/706; 707/720; 713/164; 713/165; 713/172; 713/185

(58) Field of Classification Search ................. 707/3–9, 707/706, 720; 713/164–165, 172, 185
See application file for complete search history.

(56) References Cited

U.S. PATENT DOCUMENTS

| | | | |
|---|---|---|---|
| 6,381,602 B1 * | 4/2002 | Shoroff et al. | 707/741 |
| 6,892,307 B1 * | 5/2005 | Wood et al. | 726/8 |
| 7,793,342 B1 * | 9/2010 | Ebrahimi et al. | 726/8 |
| 2003/0149781 A1 * | 8/2003 | Yared et al. | 709/229 |
| 2005/0076248 A1 * | 4/2005 | Cahill et al. | 713/202 |
| 2005/0120233 A1 * | 6/2005 | Halcrow et al. | 713/193 |
| 2005/0289144 A1 * | 12/2005 | Dettinger et al. | 707/9 |
| 2006/0021016 A1 * | 1/2006 | Birk et al. | 726/10 |
| 2006/0294192 A1 * | 12/2006 | Mao et al. | 709/213 |
| 2007/0016782 A1 * | 1/2007 | Crall et al. | 713/175 |
| 2007/0130463 A1 * | 6/2007 | Law et al. | 713/168 |
| 2007/0180258 A1 * | 8/2007 | Broussard et al. | 713/182 |
| 2007/0204168 A1 * | 8/2007 | Cameron et al. | 713/185 |
| 2007/0220268 A1 * | 9/2007 | Krishnaprasad et al. | 713/182 |
| 2007/0261099 A1 * | 11/2007 | Broussard et al. | 726/1 |
| 2008/0235196 A1 * | 9/2008 | Broussard et al. | 707/3 |

* cited by examiner

*Primary Examiner* — Hanh B Thai
(74) *Attorney, Agent, or Firm* — Hunton & Williams LLP

(57) ABSTRACT

Method and apparatus for searching a storage system for confidential data is described. One aspect of the invention relates to searching a computer for confidential data related to user. User information comprising the confidential data is obtained from a digital identity for the user. A rule that provides a secure representation of the user information is generated. A storage system in the computer is searched using the rule to detect one or more instances of the user information within at least one file.

16 Claims, 5 Drawing Sheets

FIG. 4    400

METHOD AND APPARATUS FOR SEARCHING A STORAGE SYSTEM FOR CONFIDENTIAL DATA

BACKGROUND OF THE INVENTION

1. Field of the Invention

Embodiments of the invention generally relate to computers. More specifically, this disclosure relates to a method and apparatus for searching a storage system for confidential data.

2. Description of the Related Art

In a computer network, such as the Internet, users typically transmit personal and confidential information at the behest of a particular application or service. The application or service may use the confidential information for various purposes, including authenticating the user. One such well-known scenario involves the transmission of a username and password over the network to an application, such as web site on the Internet. Since the username and password may be used to gain access to additional confidential information of the user's, it is desirable to keep the username and the password themselves confidential. In essence, the username and password provide a digital identity of the user, which the user desired to keep secret.

As applications and services on networks such as the Internet proliferate, users have to create and maintain more and more digital identities. For example, a user may create several username/password pairs for various web sites. These digital identities may include various other types of confidential information, such as social security numbers, account numbers, and the like. Since these identities are digital in nature, there is a risk that the information therein is included in one or more unprotected digital forms, such as unprotected files on a user's computer. This may increase the risk that a user's confidential information is obtained and used without authorization. Therefore, there exists a need in the art for a method and apparatus that searches a user's computer for confidential data.

SUMMARY OF THE INVENTION

One aspect of the invention relates to searching a computer for confidential data related to user. User information comprising the confidential data is obtained from a digital identity for the user. A rule that provides a secure representation of the user information is generated. A storage system in the computer is searched using the rule to detect one or more instances of the user information within at least one file.

Another aspect of the invention relates to a computer system. The storage system is configured to store files. An identity provider is configured to manage a digital identity for a user. A security agent is configured to obtain user information comprising confidential data from the digital identity, generate a rule that provides a secure representation of the user information, and search the storage system using the rule to detect one or more instances of the user information within the files.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
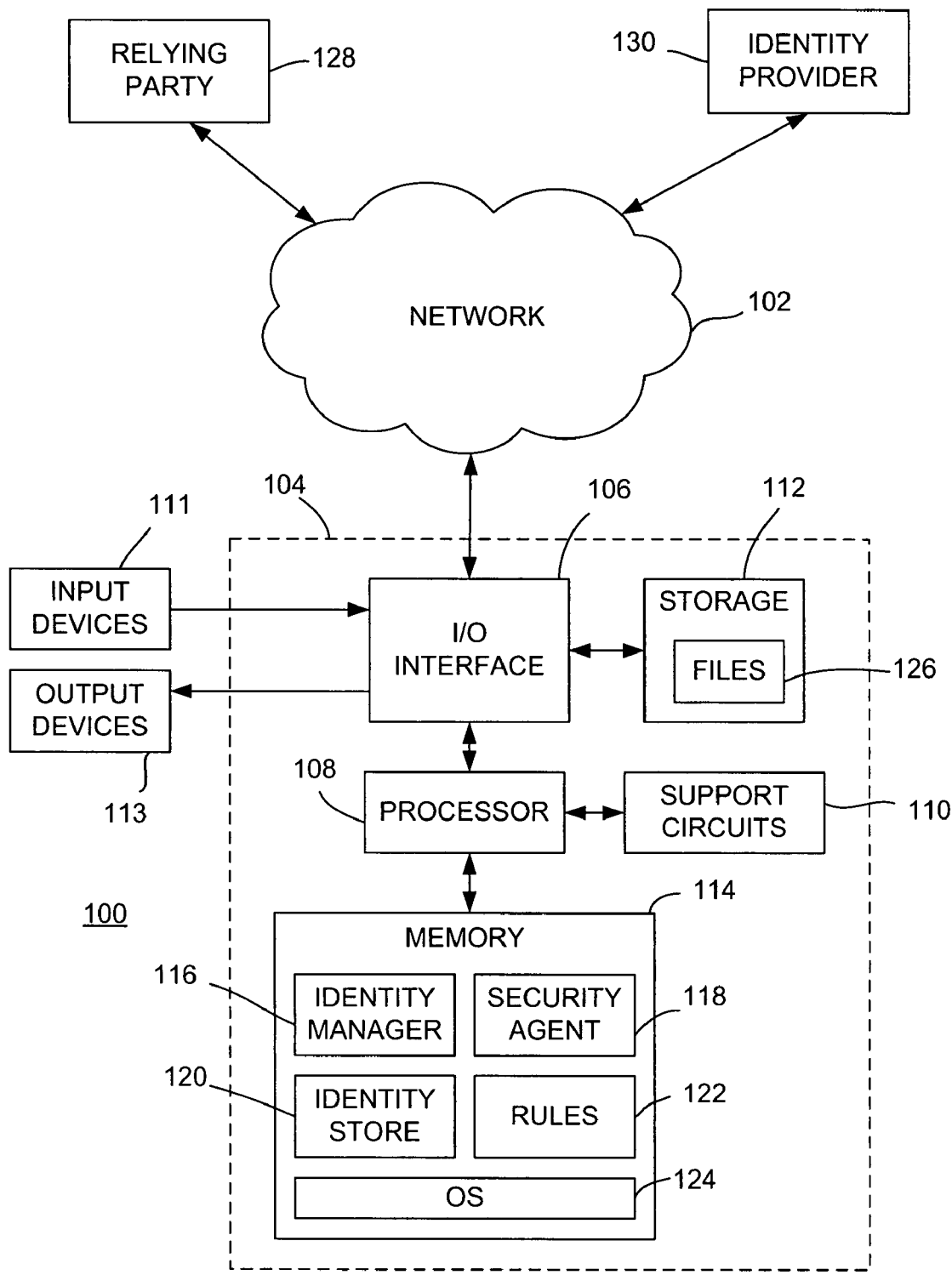
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 102 coupled to a computer 104. The computer 104 illustratively includes a processor 108, a memory 114, various support circuits 110, an I/O interface 106, and a storage system 112. The processor 108 may include one or more microprocessors known in the art. The support circuits 110 for the processor 108 include conventional cache, power supplies, clock circuits, data registers, I/O interfaces, and the like. The I/O interface 106 may be directly coupled to the memory 114 or coupled through the processor 108. The I/O interface 106 may also be configured for communication with input devices 111 and/or output devices 113, such as, network devices, various storage devices, mouse, keyboard, display, and the like. The I/O interface 106 is also coupled to the network 102 and the storage system 112. The storage system 112 may include one or more storage devices, such as one or more disk drives. The network 102 comprises a communication system that connects computer systems by wire, cable, fiber optic, and/or wireless links facilitated by various types of well-known network elements, such as hubs, switches, routers, and the like. The network 102 may employ various well-known protocols to communicate information. For example, the network 102 may be part of the Internet.

The memory 114 stores processor-executable instructions and/or data that may be executed by and/or used by the processor 108. These processor-executable instructions may comprise hardware, firmware, software, and the like, or some combination thereof. Modules having processor-executable instructions that are stored in the memory 114 may include an identity manager 116 and a security agent 118. The computer 104 may be programmed with an operating system 124, which may include OS/2, Java Virtual Machine, Linux, Solaris, Unix, HPUX, AIX, Windows, Windows95, Windows98, Windows NT, and Windows2000, WindowsME, WindowsXP, Windows Server, among other known platforms. At least a portion of the operating system 124 may be disposed in the memory 114. The memory 114 may include one or more of the following random access memory, read only memory, magneto-resistive read/write memory, optical read/write memory, cache memory, magnetic read/write memory, and the like, as well as signal-bearing media as described below.

The identity manager 116 is configured to manage digital identities for one or more users of the computer 104. The identity manager 116 establishes and maintains objects associated with the digital identities. When transmitted over the network 102, each of the digital identities is represented by a security token (also referred to as a token). A token includes one or more claims, each of which includes some part of the total information conveyed by the digital identity. For example, a token may include claims for a username, a password, credit card numbers, and/or a myriad of other types of information. The tokens may be in a variety of different formats, such as X.509 certificates, Kerberos tickets, and the like. A token may also be created using a standard language, such as the Security Assertion Markup Language (SAML). One example of an identity manager is MICROSOFT CARD-SPACE, which provides an easy to understand metaphor. The CARDSPACE identity manager enables users to create "cards" (i.e., objects) that represent their profile information, which in turn is used to create security tokens that can be submitted to entities over the network 102. Information related to digital identities may be stored in the identity store 120. Some or all of the information may be stored in the identity store 120 securely (e.g., the information is encrypted). Although MICROSOFT CARDSPACE is described as an example, it is to be understood that the invention may be used with digital identities used in other types of digital identity standards, such as OpenID, Lightweight Identity Protocol (LID), secure extensible identity protocol (SXIP), and the like.

In some embodiments, the identity manager provides for two types of digital identities: self-managed identities and managed identities. To distinguish between the two types of identities, it is useful to define three distinct roles. A user is the entity that is associated with the digital identity. An identity provider is an entity that provides a digital identity for a user. A relying party 128 is an entity that in some way relies on the digital identity. For example, the relying party 128 may use the digital identity to authenticate the user. A self-managed identity is one where the user and the identity provider are one and the same. For example, if a user is creating an account at an online provider, such as AMAZON.COM, than the user is creating his or her own identity (e.g., a username and password). A self-managed identity may be backed by a public key infrastructure (PKI). As is well known in the art, a PKI provides for asymmetric encryption using a public/private key pair. A security token that conveys a self-managed identity is signed using a user's private key, and the relying party 128 authenticates the security token as originating from the user using the user's public key. Such an authentication mechanism is well known in the art.

A managed identity is a stronger form of digital identity in that the information is backed by a third party and hence is assumed to be more trustworthy. That is, an identity provider 130 external to the user provides the digital identity to the user. In the case of managed identities, the identity store 120 does not store the digital identity. Rather, the digital identity is stored and managed by the identity provider 130. Thus, the identity manager 116 requests and receives a security token from the identity provider 130, which in turn is submitted to the relying party 128. The identity manager 116 still maintains an object associated with a managed identity. The object indicates that the managed identity is available from the identity provider 130. For example, CARDSPACE creates a card for a managed identity, but the card itself does not include the digital identity. Rather, the card refers to the particular identity provider.

Managed identifies can be used in two types of transactions: disclosed and undisclosed transactions. In a disclosed transaction, the computer 104 provides the security policy of the relying party 128 to the identity provider 130. The identity provider 130 generates a token, signs it, and encrypts it for the relying party 128 (e.g., using a public key of the relying party 128). Since the token is encrypted for the relying party 128, the computer 104 cannot access the claims in the token. The identity provider 130 returns the token to the computer 104, which in turn forwards it to the relying party. This transaction is referred to as a "disclosed" transaction, since the identity provider 130 is aware of the relying party 128. In an undisclosed transaction, the identity provider 130 is not aware of the relying party 128. That is, the computer 104 requests a token from the identity provider 130 that complies with the security policy and the identity provider 130 returns the token encrypted for the user (e.g., using the user's public key). The computer 104 can access the claims in the token using the user's private key. The computer 104 decrypts the token and then re-encrypts the token for the relying party 128 (e.g., using the public key of the relying party). The computer 104 forwards the re-encrypted token to the relying party 128.

The security agent 118 is configured to identify confidential data in digital identities maintained by the identity manager 116 and search files 126 in the storage system 112 for disclosure of such confidential data. Typically, all of the information conveyed by the digital identity is deemed to be confidential. Such confidential information may include, for example, a username, a password, a credit card number, a social security number, and the like. The confidential information may also include authentication information associated with the digital identities, such as encryption keys (e.g., private keys in public/private key pairs). Note that in some cases, the user may not even be aware of such authentication information (this may be hidden by the identity manager 116) and thus the user is not aware that confidential authentication information exits. Since the authentication information is used to digitally sign and/or decrypt tokens, compromised authentication information may render the entire identity management system vulnerable. In essence, the confidential data includes any information that can be used to compromise the digital identity, the user, and/or the relying party 128. The security agent 118 obtains the confidential data from the identity manager 116 and creates rules 122 to be used in searching for instances of the confidential data in the storage system 112. Thus, the invention provides for automatic security of confidential information of the user, including confidential information that the user is unaware exists.

In some embodiments, the rules 122 themselves to not reveal anything about the confidential data. That is, the rules 122 include secure representations of the confidential data they represent in order to ensure its protection. For example, confidential data may be applied to a hash function such that each rule includes a hash of its confidential data. As is well known in the art, a hash function takes an input message and produces a fixed length string as output (referred to as a message digest). Exemplary hash functions include MD5 and SHA-1. To search a given file with a given rule, hashes are computed for chunks of the file and the hashes are compared to the hash in the rule. The size of the chunks is determined to match the size of the hash in the rule. The chunks are selected to provide a "sliding window" within the file (i.e., each successive chunk is shifted by one byte) in order to completely search the file for the confidential data. If one of the file chunks yields In other embodiments, the rules 122 include the confidential data in plaintext and the files are searched using conventional text searching algorithms. Including the confidential data in plaintext, however, is less secure than computing a hash of the confidential data.

In some embodiments, a rule is created for each of one or more digital identities managed by the identity manager. The security agent 118 links the rule with the digital identity. For example, the security agent 118 may link the rule with the object created by the identity manager 116 associated with the digital identity. The identity manager 116 and/or the security agent 118 may include a user interface (UI), which includes a command to search the storage system 112 for confidential information related to a digital identity. In some embodiments, the security agent 118 automatically searches the storage system 112 for the confidential data. For example, the security agent 118 may search the storage system 112 once for all existing ones of the files 126, and then for each newly created or modified file thereafter (e.g., in real time as new files are being created or existing files are being modified).

Figure 2:
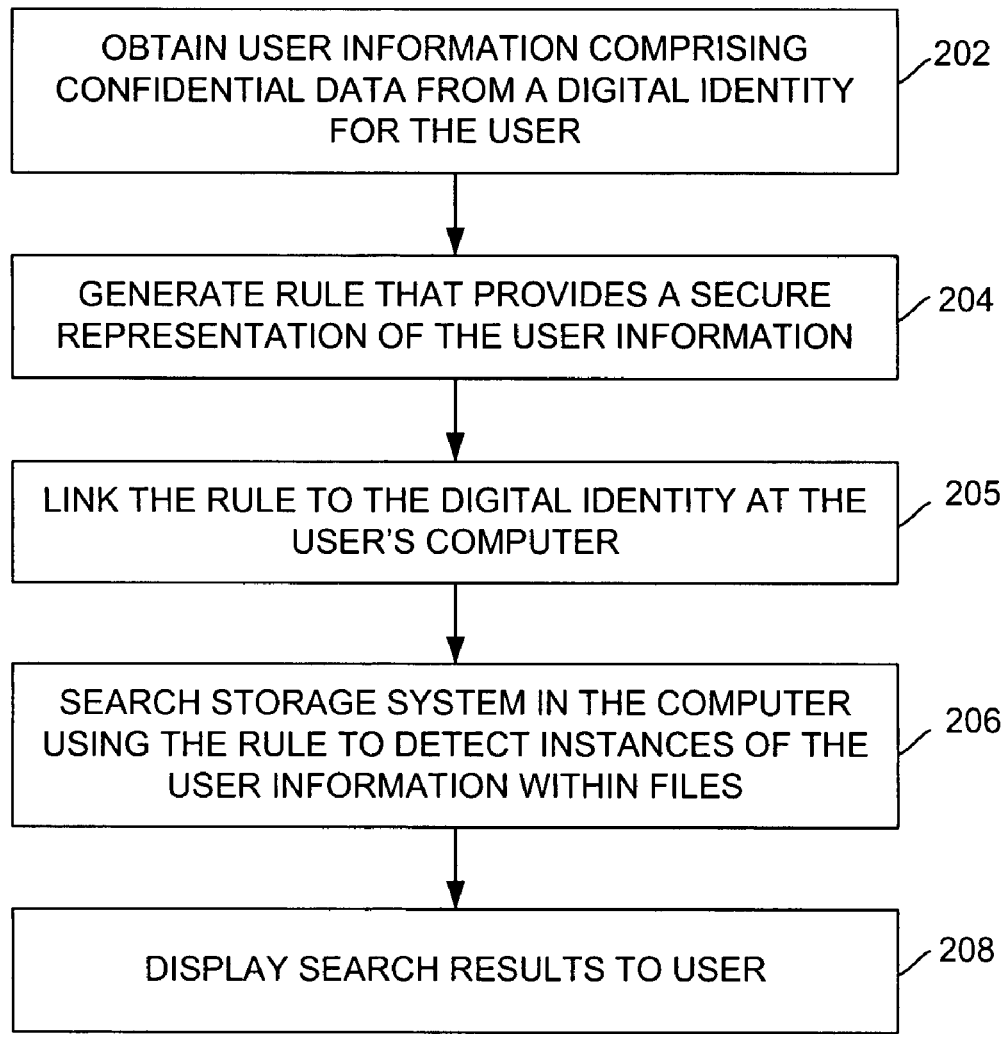
FIG. 2 is a flow diagram depicting an exemplary embodiment of a method of searching a computer for confidential data related to a user in accordance with one or more aspects of the invention.

FIG. 2 is a flow diagram depicting an exemplary embodiment of a method 200 of searching a computer for confidential data related to a user in accordance with one or more aspects of the invention. The method 200 begins at step 202, where user information comprising the confidential data is obtained from a digital identity for the user. For example, a digital identity may include a username and password for a user. At step 204, a rule that provides a secure representation of the user information is generated. The rule may include one or more parts, each of which is associated with a different item of the user information obtained at step 202 (e.g., a part for the username and a part for the password). The secure representation may comprise a hash of the confidential data. That is, a hash is computed for each item of user information obtained at step 202 and stored as a part of the rule.

At step 205, the rule may be linked to the digital identity at the computer. At step 206, a storage system in the computer is searched using the rule to detect one or more instances of the user information within at least one file. For example, all existing files on the storage system may be searched using the rule. Thereafter, each newly created file and each modified file is search using the rule. Alternatively, the files may be search upon command from the user. At step 208, results of the search may be displayed to the user. For example, any files that contain the user information may be displayed to the user. Actions a user can take with respect to the offending files may be displayed to the user.

Figure 3:
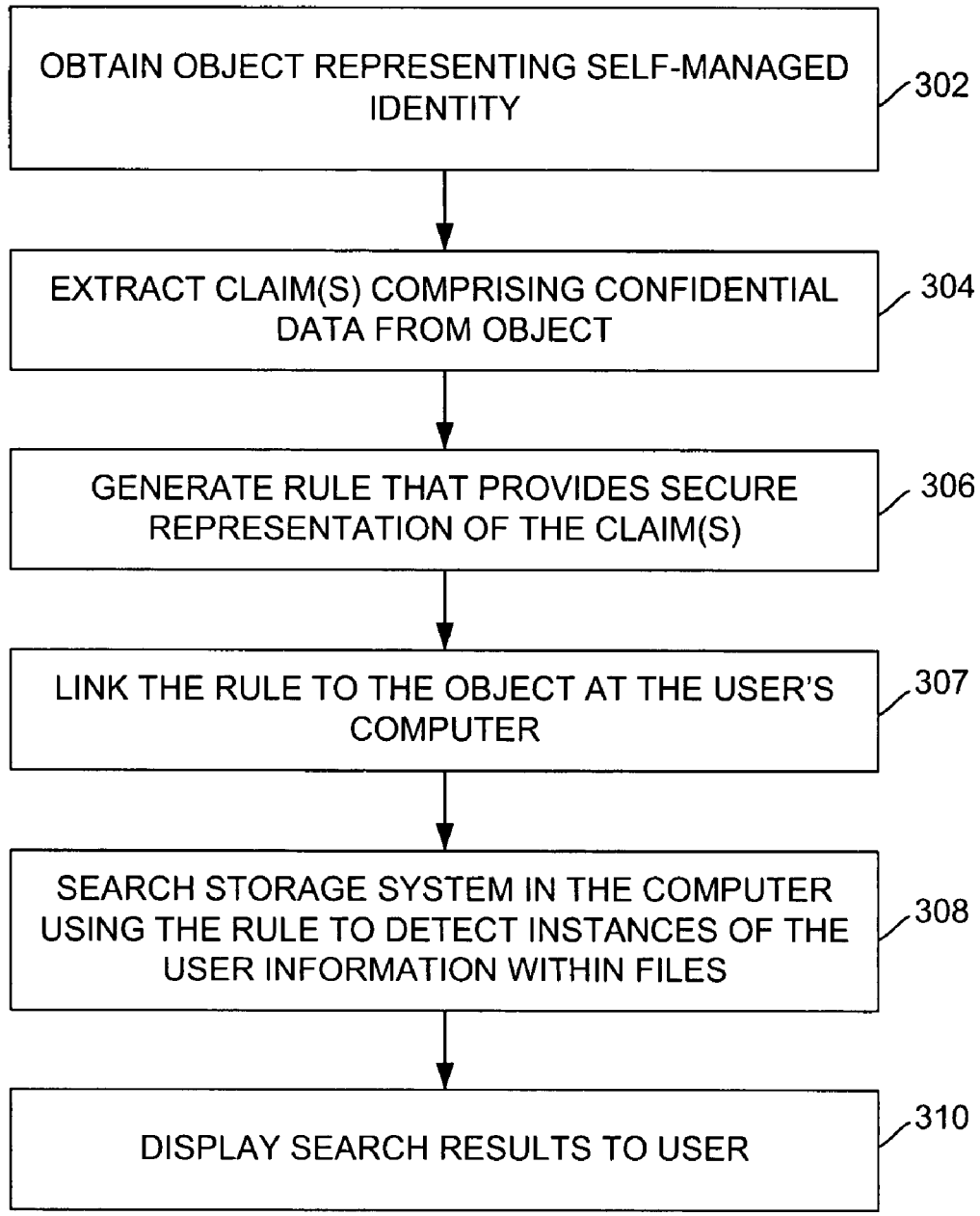
FIG. 3 is a flow diagram depicting another exemplary embodiment of a method of searching a computer for confidential data related to a user in accordance with one or more aspects of the invention.

FIG. 3 is a flow diagram depicting another exemplary embodiment of a method 300 of searching a computer for confidential data related to a user in accordance with one or more aspects of the invention. In the present embodiment, the confidential data is included in a self-managed digital identity. At step 302, an object representing the self-managed digital identity is obtained. For example, the object may be obtained from an identity store on the computer. At step 304, one or more claims comprising the confidential data is/are extracted from the object. For example, the object may include username and password claims. At step 306, a rule that provides a secure representation of the claim(s) is generated. The rule may include one or more parts, each of which is associated with a different claim obtained at step 304 (e.g., a part for the username and a part for the password). The secure representation may comprise a hash of the confidential data. That is, a hash is computed for each item of user information obtained at step 304 and stored as a part of the rule.

At step 307, the rule may be linked to the object associated with the self-managed digital identity at the computer. At step 308, a storage system in the computer is searched using the rule to detect one or more instances of the user information within at least one file. For example, all existing files on the storage system may be searched using the rule. Thereafter, each newly created file and each modified file is searched using the rule. Alternatively, the files may be searched upon command from the user. At step 310, results of the search may be displayed to the user. For example, any files that contain the user information may be displayed to the user. Actions a user can take with respect to the offending files may be displayed to the user.

Figure 4:
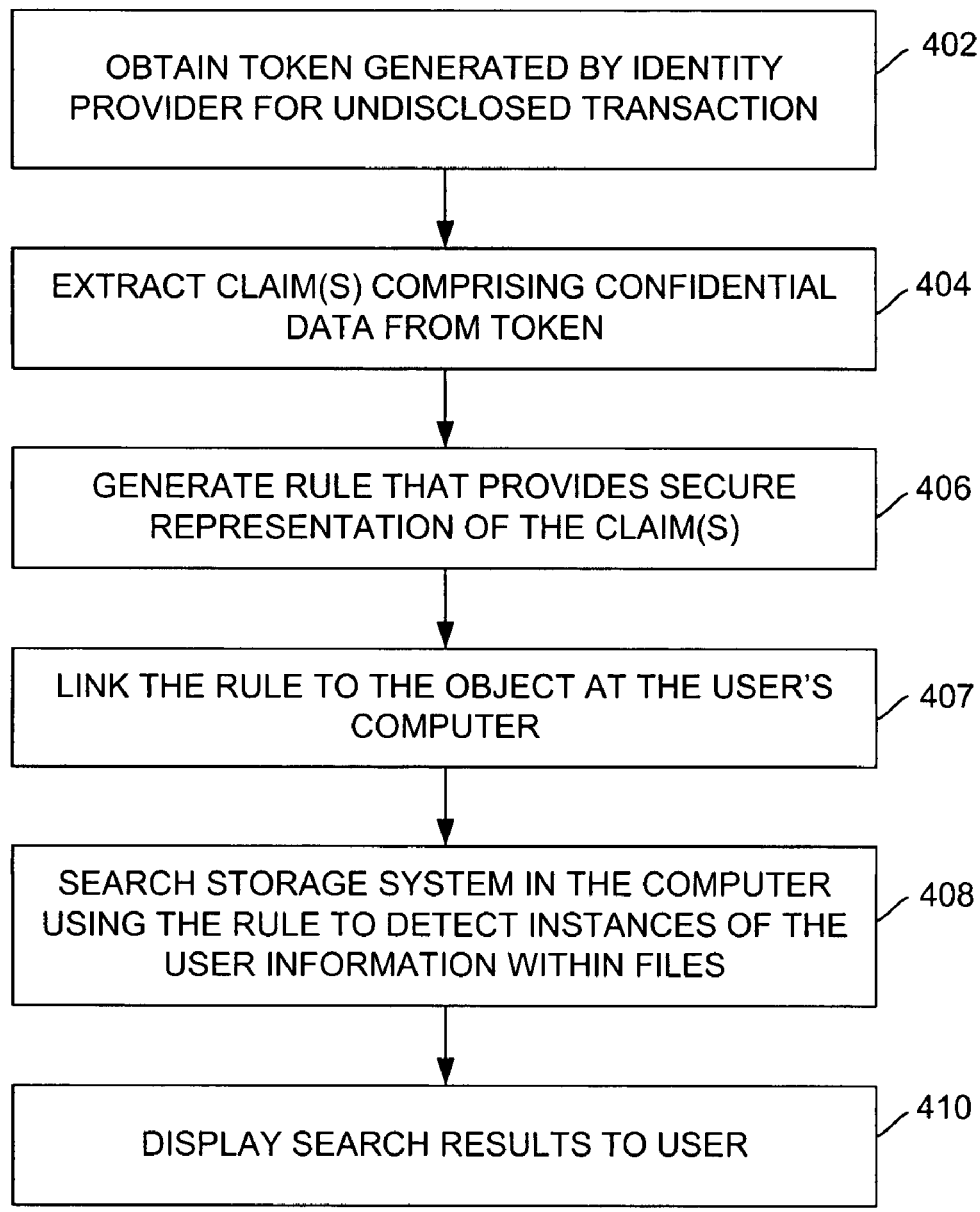
FIG. 4 is a flow diagram depicting another exemplary embodiment of a method of searching a computer for confidential data related to a user in accordance with one or more aspects of the invention.

FIG. 4 is a flow diagram depicting another exemplary embodiment of a method 400 of searching a computer for confidential data related to a user in accordance with one or more aspects of the invention. In the present embodiment, the confidential data is included in a managed digital identity. In addition, the managed digital identity is configured to be used in an undisclosed transaction. At step 402, a token generated by an identity provider for the anonymous transaction is received. The token represents the managed digital identity. Since this is an undisclosed transaction, the token is encrypted for use by the user (i.e., encrypted using the user's public key). At step 404, one or more claims comprising the confidential data is/are extracted from the token. For example, the token may include username and password claims. At step 406, a rule that provides a secure representation of the claim(s) is generated. The rule may include one or more parts, each of which is associated with a different claim obtained at step 404 (e.g., a part for the username and a part for the password). The secure representation may comprise a hash of the confidential data. That is, a hash is computed for each item of user information obtained at step 404 and stored as a part of the rule.

At step 407, the rule may be linked to the object associated with the managed digital identity at the computer. At step 408, a storage system in the computer is searched using the rule to detect one or more instances of the user information within at least one file. For example, all existing files on the storage system may be searched using the rule. Thereafter, each newly created file and each modified file is search using the rule. Alternatively, the files may be search upon command from the user. At step 410, results of the search may be displayed to the user. For example, any files that contain the user information may be displayed to the user. Actions a user can take with respect to the offending files may be displayed to the user.

Figure 5:
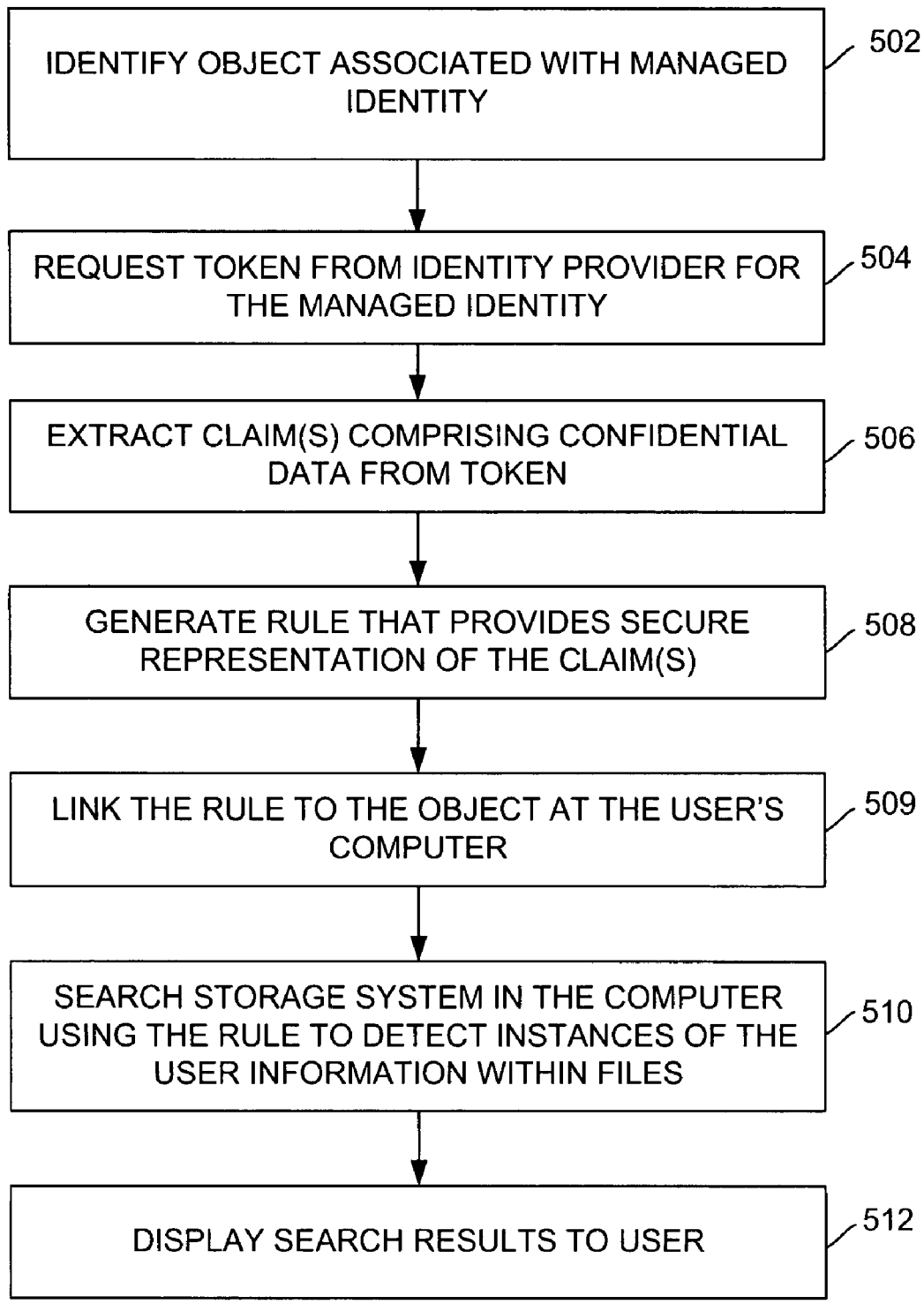
FIG. 5 is a flow diagram depicting yet another exemplary embodiment of a method of searching a computer for confidential data related to a user in accordance with one or more aspects of the invention

FIG. 5 is a flow diagram depicting another exemplary embodiment of a method 500 of searching a computer for confidential data related to a user in accordance with one or more aspects of the invention. In the present embodiment, the confidential data is included in a managed digital identity. In addition, the managed digital identity is configured to be used in a disclosed transaction. At step 502, an object associated with the managed digital identity is identified. At step 504, a token is requested from an identity provider for the managed digital identity. Since this is a disclosed transaction, the token is typically encrypted for the relying party (i.e., encrypted with the relying party's public key) and thus not accessible by the user. Thus, at step 504, the user must specifically request the token from the identity provider. In response, the identity provider encrypts the token for the user (i.e., using the user's public key). At step 506, one or more claims comprising the confidential data is/are extracted from the token. For example, the token may include username and password claims. At step 508, a rule that provides a secure representation of the claim(s) is generated. The rule may include one or more parts, each of which is associated with a different claim obtained at step 506 (e.g., a part for the username and a part for the password). The secure representation may comprise a hash of the confidential data. That is, a hash is computed for each item of user information obtained at step 506 and stored as a part of the rule.

At step 509, the rule may be linked to the object associated with the managed digital identity at the computer. At step 510, a storage system in the computer is searched using the rule to detect one or more instances of the user information within at least one file. For example, all existing files on the storage system may be searched using the rule. Thereafter, each newly created file and each modified file is search using the rule. Alternatively, the files may be search upon command from the user. At step 512, results of the search may be displayed to the user. For example, any files that contain the user information may be displayed to the user. Actions a user can take with respect to the offending files may be displayed to the user.

Managed digital identities may be used in both undisclosed and disclosed transactions. In another embodiment, the security agent 118 waits for an undisclosed transaction before creating rules to search for confidential data. Such an embodiment may be employed in cases where the identity provider will not provide a token to the user upon request for a disclosed transaction.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method of searching a computer for confidential data related to a user, comprising:
    obtaining user information comprising the confidential data from a digital identity for the user; wherein the digital identity comprises a managed digital identity, and wherein the step of obtaining comprises:
        identifying an object maintained on the computer that is associated with the managed digital identity;
        requesting a token from an identity provider representing the managed digital identity; and
        extracting one or more claims comprising the user information from the token;
    generating a rule that provides a secure representation of the user information; and
    searching a storage system in the computer using the rule to detect one or more instances of the user information within at least one file.

2. The method of claim 1, wherein the digital identity comprises a self-issued digital identity, and wherein the step of obtaining comprises:
    obtaining an object maintained on the computer, the object representing the self-issued digital identity; and
    extracting one or more claims comprising the user information from the object.

3. The method of claim 1, wherein the digital identity comprises a managed digital identity, and wherein the step of obtaining comprises:
    obtaining a token generated by an identity provider for an undisclosed transaction with a relying party, the token representing the managed digital identity;
    extracting one or more claims comprising the user information from the token.

4. The method of claim 3, further comprising:
    linking the rule to an object maintained on the computer that is associated with the managed digital identity.

5. The method of claim 1, wherein the step of searching comprises:
    searching all existing files stored on the storage system using the rule; and
    searching, in real time, each newly created file and each of the existing files that has been modified using the rule.

6. The method of claim 1, wherein the user information includes authentication information used to authenticate the digital identity.

7. The method of claim 1, wherein the secure representation comprises a hash of the user information.

8. Apparatus for searching a computer for confidential data related to a user, comprising:
    means for obtaining user information comprising the confidential data from a digital identity for the user wherein the digital identity comprises a managed digital identity, and wherein the means for obtaining comprises:
        means for identifying an object maintained on the computer that is associated with the managed digital identity;
        means for requesting a token from an identity provider representing the managed digital identity; and
        means for extracting one or more claims comprising the user information from the token;
    means for generating a rule that provides a secure representation of the user information; and
    means for searching a storage system in the computer using the rule to detect one or more instances of the user information within at least one file.

9. The apparatus of claim 8, wherein the digital identity comprises a self-issued digital identity, and wherein the means for obtaining comprises:
    means for obtaining an object maintained on the computer, the object representing the self-issued digital identity; and
    means for extracting one or more claims comprising the user information from the object.

10. The apparatus of claim 9, wherein the digital identity comprises a managed digital identity, and wherein the means for obtaining comprises:
    means for obtaining a token generated by an identity provider for an undisclosed transaction with a relying party, the token representing the managed digital identity;
    means for extracting one or more claims comprising the user information from the token.

11. The apparatus of claim 10, further comprising:
means for linking the rule to an object maintained on the computer that is associated with the managed digital identity.

12. The apparatus of claim 8, wherein the means for searching comprises:
means for searching all existing files stored on the storage system using the rule; and
means for searching, in real time, each newly created file and each of the existing files that has been modified using the rule.

13. A computer system, comprising:
a storage system configured to store files;
an identity manager configured to manage a digital identity for a user; and
a security agent configured to:
obtain user information comprising confidential data from the digital identity, wherein the digital identity is a managed digital identity;
generate a rule that provides a secure representation of the user information;
search the storage system using the rule to detect one or more instances of the user information within at least one file;
link the rule to the object;
identify an object maintained on the computer that is associated with the managed digital identity;
request a token from an identity provider representing the managed digital identity; and
extract one or more claims comprising the user information from the token; and
an identity store configured to store an object associated with the digital identity.

14. The computer system of claim 13, wherein the security agent is configured to:
search all existing ones of the files stored on the storage system using the rule; and
search, in real time, each newly created one of the files and each of the files that has been modified using the rule.

15. The computer system of claim 13, wherein the user information includes authentication information used to authenticate the digital identity.

16. The computer system of claim 13, wherein the secure representation comprises a hash of the user information.

* * * * *